(12) United States Patent
Komiya et al.

(10) Patent No.: US 7,196,854 B2
(45) Date of Patent: Mar. 27, 2007

(54) COMPLEX OPTICAL ELEMENT AND METHOD FOR MANUFACTURING THEREOF

(75) Inventors: Keiji Komiya, Tochigi (JP); Hatsuo Hirose, Tochigi (JP); Iwao Yokoyama, Tochigi (JP); Hajime Kurahashi, Tochigi (JP)

(73) Assignee: Fujinon Sano Corporation, Sano (JP)

( * ) Notice: Subject to any disclaimer, the term of this patent is extended or adjusted under 35 U.S.C. 154(b) by 22 days.

(21) Appl. No.: 10/927,125

(22) Filed: Aug. 27, 2004

(65) Prior Publication Data

US 2005/0083586 A1 Apr. 21, 2005

(30) Foreign Application Priority Data

Aug. 29, 2003 (JP) ............... 2003-305715

(51) Int. Cl.
*G02B 3/08* (2006.01)
*G02B 5/04* (2006.01)
(52) U.S. Cl. .................. 359/741; 359/796; 359/837; 359/839

(58) Field of Classification Search ................ 359/741, 359/796
See application file for complete search history.

(56) References Cited

U.S. PATENT DOCUMENTS

| 3,980,399 | A | * | 9/1976 | Howden ..................... 359/718 |
| 5,805,343 | A | * | 9/1998 | Kozasa et al. .............. 359/620 |
| 6,661,552 | B2 | * | 12/2003 | Hira .......................... 359/237 |
| 2003/0035213 | A1 | * | 2/2003 | Ogawa ....................... 359/565 |
| 2003/0142896 | A1 | * | 7/2003 | Kikuchi et al. ............... 385/14 |
| 2005/0117347 | A1 | * | 6/2005 | Melpignano et al. ....... 362/309 |

FOREIGN PATENT DOCUMENTS

JP      2-196201    *   9/1990

* cited by examiner

*Primary Examiner*—Jordan M. Schwartz
(74) *Attorney, Agent, or Firm*—Oblon, Spivak, McClelland, Maier & Neustadt, P.C.

(57) ABSTRACT

A lens-laminated composite optical element composed of a vitreous optical element having a plane surface to perform inherent optical functions, and a thin and filmy transparent plastic lens portion molded in a curved lens profile and laminated on the plane surface of the vitreous optical element by the use of a mold.

8 Claims, 5 Drawing Sheets

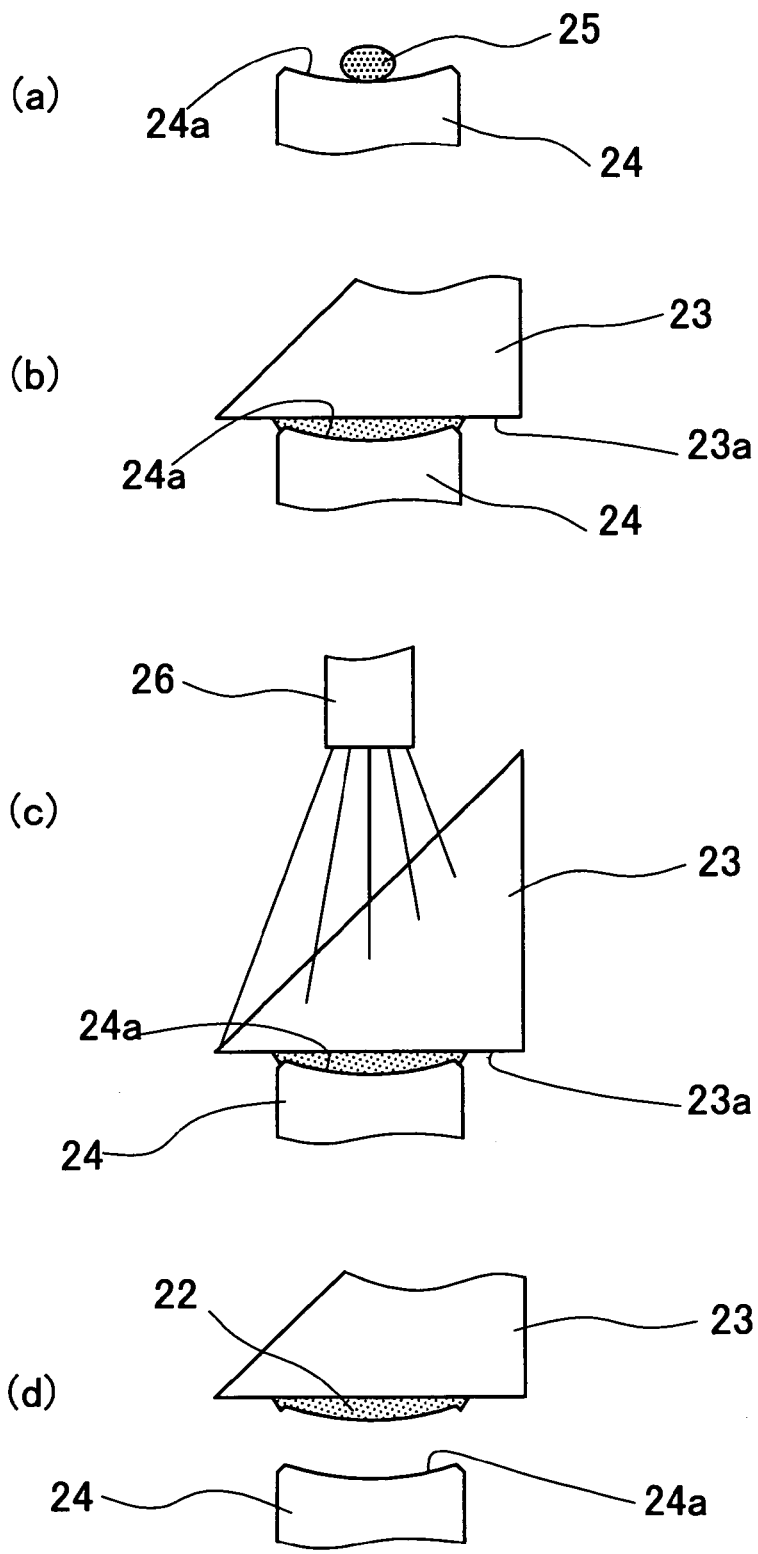

COMPLEX OPTICAL ELEMENT AND METHOD FOR MANUFACTURING THEREOF

BACKGROUND OF THE INVENTION

1. Field of the Art

This invention relates to a complex or composite optical element which basically has inherent optical functions as a prism, half mirror or reflector mirror, and more particularly to a lens-laminated composite optical element having a curved lens portion laminated on a plane surface of a vitreous optical element, either on a plane of incidence or a plane of emergence of light entrance of the vitreous optical element to provide complex or composite optical functions in an optical system.

2. Prior Art

Optical pickup devices are widely in use for reading and writing information on optical discs or similar information recording media. In this connection, currently both CD (compact disc) and DVD (digital versatile disc) are in use as information recording or storage media, and attempts have been made to develop and put in use a CD/DVD drive which is capable of reading CDs and writing and reading DVDs, for example, as described in Japanese Laid-Open Patent Application H10-27378. CDs and DVDs differ from each other not only in disc thickness but also in wavelength of laser beam, which is approximately at 780 nm in the case of CDs and approximately at 650 nm in the case of DVDs. Besides, CDs and DVDs require pickups which are different in NA (numerical aperture). Therefore, an optical pickup for a CD/DVD drive needs to be able to switch the laser light source between a CD reading laser light source and a DVD wring/reading laser light source. The laser light source can be switched, for example, by the use of a polarized prism. More particularly, the polarized prism is arranged to transmit a laser beam of 780 nm from a CD laser light source and to reflect a laser beam of 650 nm from a DVD laser light source. Thus, a light path from the polarized prism and a information recording medium is shared between a CD and a DVD for the purpose of providing an optical pickup which is downsized and compact in form.

In this connection, it often becomes necessary to use an optical lens like a spherical or aspherical lens in combination with the polarized prism for the purpose of correcting one or certain kinds of aberrations such as astigmatic aberration, spherical aberration and coma aberration which occur as the laser beam upon transmission through the polarizing prism. In various optical systems including optical pickups, a convex lens, a concave lens and an aspherical lens with a curved surface like cylindrical surface or a toroidal surface are used for converging a light flux to a light path or for shaping a light beam into a desired beam pattern.

In a case where a vitreous optical element like a polarized prism is used in combination with various optical lenses as mentioned above in an optical system, it becomes necessary to give independency to each one of the lenses to be incorporated into the optical system. However, in such a case, since individual optical elements are large in thickness, the optical system inevitably becomes large in size and weight. In this connection, it is also possible to form a lens surface integrally on a transparent vitreous substrate by injection molding a transparent synthetic resin. The integral molding of a plastic lens on a vitreous optical element makes it possible to downsize optical assembly units into a compact form. However, integral molding of a plastic lens has problems in that a plastic lens portion is large in linear expansion coefficient and inferior in resistance to environmental factors such as temperature and humidity. Alternatively, it is conceivable to add lens functions by injection molding a glass lens on a prism although glass injection molding is very costly and difficult to adopt.

SUMMARY OF THE INVENTION

Accordingly, it is an object of the present invention to provide a lens-laminated composite optical element having a plastic lens portion laminated on a plane surface of a vitreous optical element, more particularly, a lens-laminated composite optical element which is satisfactory in environmental resistance and yet which can be manufactured at a low cost, solving the problems of increased size and weight which have thus far been experienced in assembling optical systems incorporating a lens-laminated composite optical element.

In accordance with the present invention, in order to solve the above-stated objective, there is provided a lens-laminated composite optical element, comprising: a piece of glass having a plane surface to function as a vitreous optical element; and a transparent filmy plastic lens portion molded in a predetermined curved profile and laminated on said plane surface of said vitreous optical element by the use of a mold.

Further, in accordance with the present invention, there is also provided a method for fabricating a lens-laminated composite optical element by molding and laminating a plastic lens portion on a plane surface of a vitreous optical element, which comprises the steps of: placing a gob of an ultraviolet curing or thermosetting synthetic resin on a mold having at a top end a transfer surface corresponding to a predetermined curved profile of a plastic lens to be laminated; heating the resin gob up to a softened or molten state; compressing the resin gob between the transfer surface of the mold and the plane surface of the vitreous optical element to transfer the curved profile to the softened or molten resin material while molding same into a filmy plastic lens; hardening or curing the filmy plastic lens; and separating the mold away from the vitreous optical element, leaving a laminated filmy plastic lens portion on the latter.

The vitreous optical element to be used in the present invention has its own optical functions, and is of the type which has a plane surface at least either at a plane of incidence or at a plane of emergence of a light beam. For example, the vitreous optical element can be a prism, a reflecting mirror or a half mirror. A prism can be arranged as a polarized prism having a plane of polarization at one side a glass sheet.

Examples of the lens portion to be laminated on a plane surface of a vitreous optical element include a convex lens, a concave lens, a diffraction type lens, an aspheric lens which is symmetric in the direction of rotation, and cylindrical and toroidal surfaces which are asymmetric in the direction of rotation. Accordingly, the laminated lens portion is molded in a curved profile which suits the purpose of use, for instance, correction of aberrations or beam pattern shaping.

The lens portion is formed of a transparent synthetic resin material, and molded and laminated on a plane surface of a vitreous optical element by the use of a mold with a transfer surface corresponding to a profile of a lens to be laminated. For transferring the profile of the transfer surface, a gob of synthetic resin material which is placed on the transfer surface is heated up to a softened or molten state. As soon as the profile of the lens surface is transferred, the synthetic resin material is cured or hardened. In order to harden the laminated plastic lens portion quickly, it is desirable to use an ultraviolet curing synthetic resin or a thermosetting synthetic resin. On the condition that desired functions are performed in a satisfactory way, the laminated lens portion should be small in curvature and should be in a thin filmy form which is smaller than 1 mm in maximum thickness.

Thus, a small and compact lens-laminated composite optical element is obtained by laminating a filmy plastic lens portion on a plane surface of a vitreous optical element in the manner just described above. The plastic lens portion suffices to have a lens surface of a specified curvature, so that it can be substantially in a thin and filmy form and extremely small in weight. Since the laminated plastic lens portion is in a thin filmy form and strongly bonded on a plane surface of a vitreous optical element, the coefficient of linear expansion of the laminated lens portion is substantially substituted by that of the vitreous optical element. That is to say, the laminated plastic lens portion becomes to have excellent environmental resistance, suppressing fluctuations in curvature of the lens surface under varying temperature and moisture conditions.

Thus, the lens-laminated composite optical element according to the present invention is composed of a vitreous optical element and a transparent plastic lens which is laminated in a thin filmy form on a plane surface of the vitreous optical element by the use of a molding means. The composite optical element, with complex and composite optical functions, can be assembled into various optical systems in a compact form.

The above and other objects, features and advantages of the present invention will become apparent from the following detailed description, taken in conjunction with the accompanying drawings.

Needless to say, the accompanying drawings show by way of example preferred embodiments of the invention, and the present invention should not be construed as being limited exemplary forms shown in the drawings.

BRIEF DESCRIPTION OF THE DRAWINGS

In the accompanying drawings:

FIG. 5 is a schematic illustration explanatory of a method of laminating a plastic lens on the beam splitter of FIG. 4.

DESCRIPTION OF PREFERRED
EMBODIMENTS

Hereafter, with reference to the accompanying drawings, the present invention is described more particularly by way of its preferred embodiments.

Figure 1:
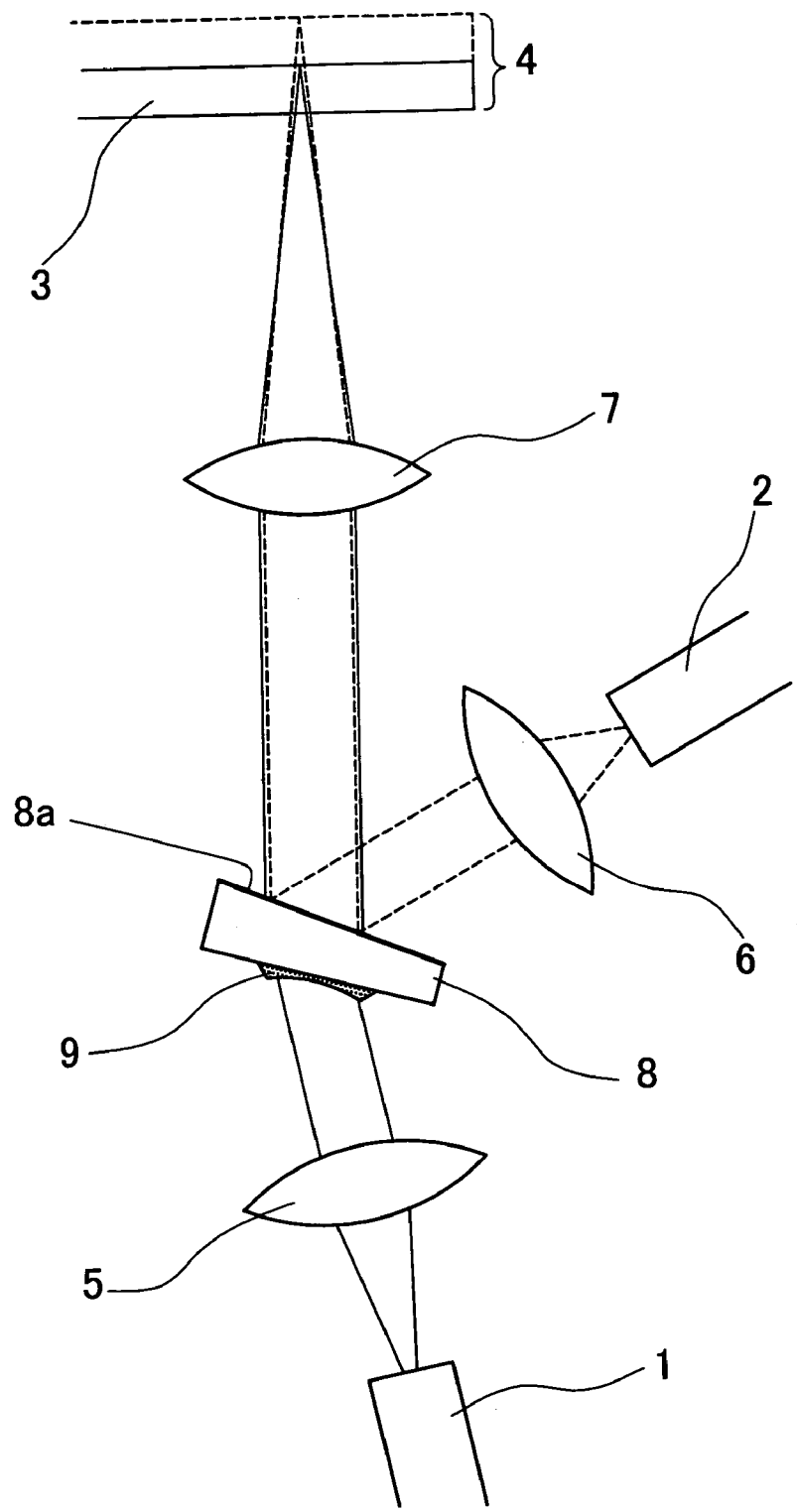
FIG. 1 is a schematic view of a lens-laminated composite optical element according to a first embodiment of the present invention, employed as a lens-equipped polarized prism in an optical system of an optical disc pickup.

Referring to FIG. 1, there is shown a first embodiment of the present invention. In this first embodiment, a lens-laminated composite optical element is applied to an optical system of an optical disc pickup as schematically shown in FIG. 1. In FIG. 1, indicated at 1 is a first laser light source, and at 2 a second laser light source. A laser beam of 780 nm wavelength is projected from the first laser light source 1 to read information on a CD 3, while a laser beam of 650 nm wavelength is projected from the second laser light source 2 to read and write information on a DVD 4. The laser beams from the first and second laser light sources 1 and 2 are collimated through collimator lenses 5 and 6 and collimated light fluxes are converged toward CD 3 and DVD 4, respectively.

Indicated at 8 in FIG. 1 is a polarized prism, and, by this polarized prism 8, the laser beams from the first and second laser light sources 1 and 2 are directed to the same light path. A polarization separator film 8a is formed on the polarized prism 8 thereby to totally transmit p-polarization component of incident light while totally reflecting s-polarization component. Accordingly, a p-polarization laser beam from the first laser light source 1 is transmitted through the polarized prism 8, and a s-polarization laser beam from the second laser light source 2 is reflected off the polarization separator film 8a of the polarized prism 8. Thus, the laser beams from the first and second laser light sources 1 and 2 take the same light path between the polarized prism 8 and the respective optical discs 3 and 4.

The laser beam from the first laser light source 1 is transmitted through the polarized prism 8. However, since the polarized prism 8 is not uniform in thickness, astigmatic aberration occurs to the laser beam. Besides, depending upon the construction of the optical system, there are possibilities of occurrence of spherical or other aberrations in addition to the astigmatic aberration. In order to correct these aberrations, a corrective lens portion 9 is provided on the polarized prism, more particularly, on a plane of incidence of the laser beam from the first laser light source 1. In this instance, the lens portion 9 a thin-wall concave lens of transparent plastic material and laminated on a plane surface of the polarized prism 8. Namely, the lens portion 9 is laminated on the polarized prism 8 to form a lens-laminated composite optical element which can be dealt with as a single optical element.

Figure 2:
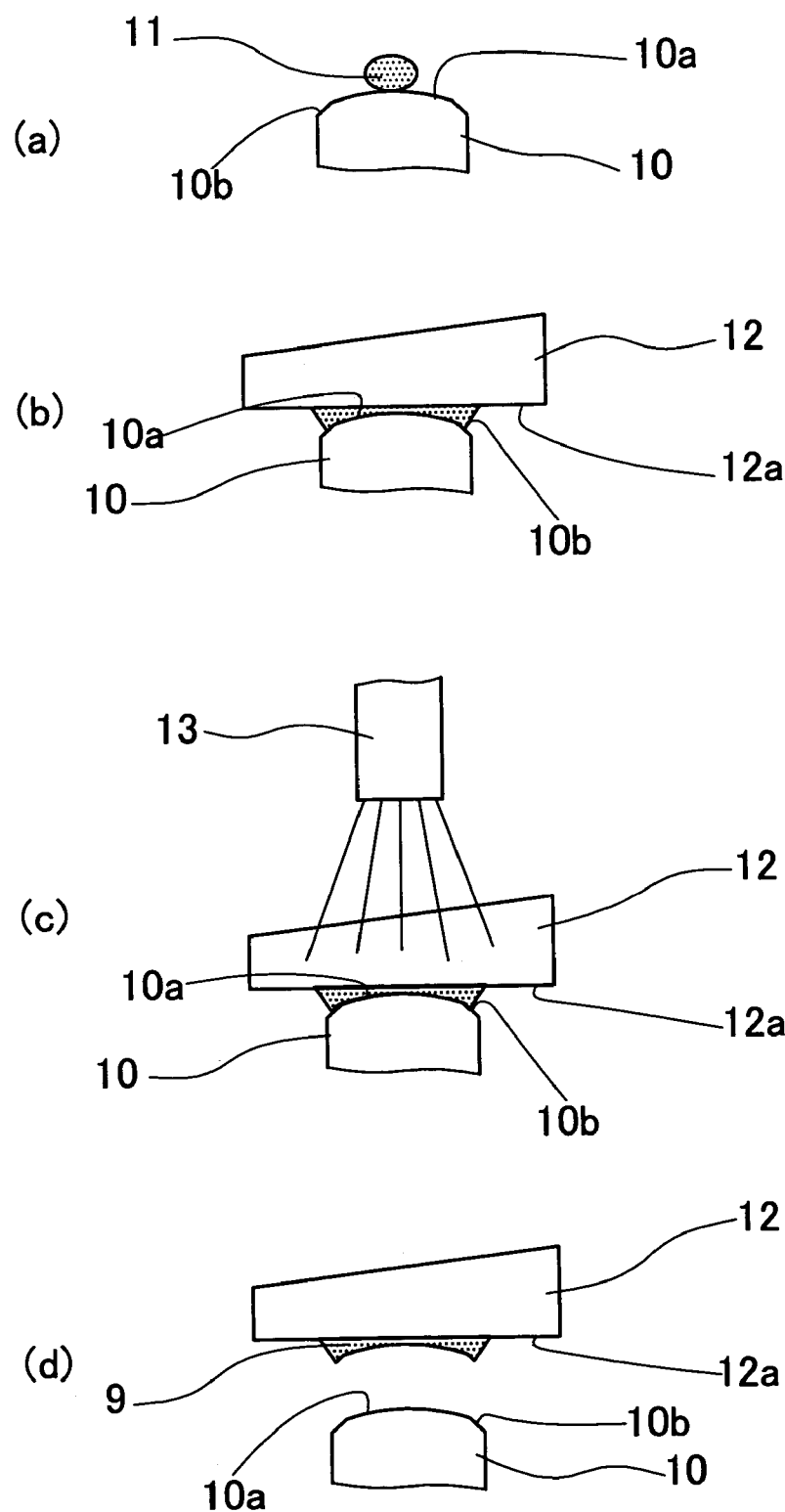
FIG. 2 is a schematic illustration explanatory of a method of laminating a plastic lens on a vitreous optical element which is a polarizing prism in this case.

Shown in FIG. 2 is a method of fabrication of the above-described lens-laminated composite optical element, having the lens portion 9 laminated on the polarized prism 8. The lens portion 9 is formed by the use of a mold 10 with a curved transfer surface 10a of a predetermined profile. As shown in FIG. 2(a), a globule or a gob 11 of a synthetic resin material to be molded into the transparent plastic lens portion 9 is fed onto the transfer surface of the mold 10. Then the synthetic resin gob 11 on the mold 10 is heated into a softened or molten state. For this purpose, for example, the mold 10 is provided with a heater, and the mold 10 as a whole is heated to bring the synthetic resin gob 11 into a softened or molten state.

As soon as the synthetic resin gob 11 on the transfer surface 10 of the mold 10 reaches a predetermined softened or molten state, the mold 10 is moved toward and butted against a plane lens laminating surface 12a of a glass sheet 12, a glass piece to be formed into the prism 8, to form and laminate a lens portion 9 on the glass sheet 12 on the side away from a surface on which the polarization separator film 8a is to be formed. If necessary, the lens portion 9 may be laminated after forming the polarization separator film 8a. However, considering the following steps of the fabrication process, it is desirable to laminate the lens portion 9 prior to forming the polarization separator film 8a on the glass sheet 12. In order to prevent entrainment of air bubbles at the time of forming the lens portion 9, the upper end of the mold 10 should not be brought into contact with the glass sheet 12.

Even in a molten state, the synthetic resin of the plastic lens material has a relatively high viscosity and tends to stick out from the transfer surface 10a under the influence of surface tension. Therefore, even if the mold 10 is not brought into contact with the glass sheet 12, the transfer surface 10a of the mold 10 can be pressed against the synthetic resin gob 11 with a pressure necessary for accurate transfer of the lens surface. By the applied pressure, air bubbles are pushed out along the lens laminating surface 12a of the glass sheet 12 and the transfer surface 10a of the mold 10 to form a lens portion 9 which is free of air bubbles at least in its effective area.

Figure 3:
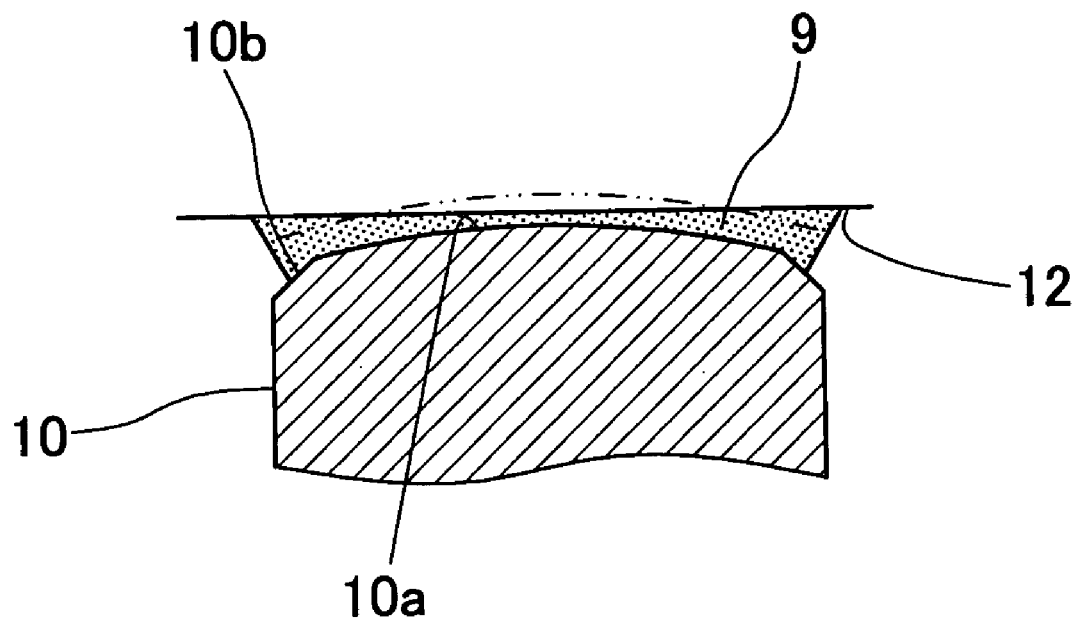
FIG. 3 is a schematic sectional view of another mold useful in the method of FIG. 2.

In this instance, the molten plastic lens material maintains a relatively high viscous state, so that, by accurately controlling the amount of the synthetic resin gob 11 to be fed to the mold 10, that portion of the molten plastic lens material, which bulges out from the transfer surface 10a of the mold 10 as indicated by an imaginary line in FIG. 3, deposit on the side of the glass sheet 12 without flowing down onto outer peripheral portions of the mold 10. In the particular embodiment shown, the mold 10 is provided with a tapered or chamfered edge portion 10b of approximately 45 degrees around the transfer surface 10a, so that extra plastic lens material which has been pushed outward of the transfer surface 10a, if any, is allowed to deposit on the chamfered portion 10b instead of flowing down onto girder portions of the mold 10. Accordingly, there is little possibility of the plastic lens material flowing down onto girder portions of the mold 10 to impair mold separability from the glass sheet 12. The extra plastic lens material which has deposited on the chamfered edge portion 10b remains on the side of the glass sheet 12 after separation and retraction of the mold 10, but it is outside the effective area of the lens portion 9 and has no possibility of posing adverse effects on optical functions of the lens portion 9.

The synthetic resin material of the plastic lens is hardened after laminating same on the lens laminating surface 12 of the glass sheet 12 in the manner as described above. For this purpose, the laminated synthetic resin material is irradiated with an ultraviolet ray from an ultraviolet irradiator 13 which is located over the glass sheet 12 as shown in FIG. 2(c). At this time, a polarization separator film 8a for the polarized prism 8 is not yet formed on the glass sheet 12, the laminated synthetic resin material is effectively irradiated with the ultraviolet ray which is transmitted through the glass sheet 12. As soon as the synthetic resin material is hardened by irradiation of an ultraviolet ray, the mold 10 is separated away from the glass sheet 12 as shown in FIG. 2(d), leaving a molded lens portion 9 on the lens laminating surface 12a of the glass sheet 12. In order to make the mold easily separable from the molded lens portion 9, it is desirable to apply a mold releasing medium on the transfer surface 10a of the mold 10 beforehand.

After forming the lens portion 9 on the lens laminating surface 12a, a polarization separator film 8a is laminated on a surface on the other side of the glass sheet 12 by vacuum deposition or by adhesion of a film. As a consequence, there is obtained a lens-laminated composite optical element which is composed of a polarized prism 8 and an aberration correcting lens portion 9.

In this instance, the lens portion 9 to be formed on the polarized prism 8 for the purpose of correcting astigmatic or other aberrations can be in the form of a concave lens or an aspheric concave lens of axial symmetry, having an extremely small curvature which is akin to a plane. Since the lens portion 9 is required of independency, it can be formed as a thin wall lens having a maximum thickness of approximately 0.7 mm and a minimum thickness approximately less than 0.1 mm. Therefore, it becomes possible to fabricate small-size, compact and lightweight lens-laminated composite optical elements at a low cost and with high accuracy. Besides, the linear expansion coefficient of the thin wall lens portion 9 which is strongly bonded on the polarized prism 8 is substantially substituted by that of the glass sheet of the polarized prism 8. This means that the lens portion 9 is almost freed from dependency on temperature of its refractive index and therefore exhibits excellent properties in environmental stability or environmental resistance.

Figure 4:
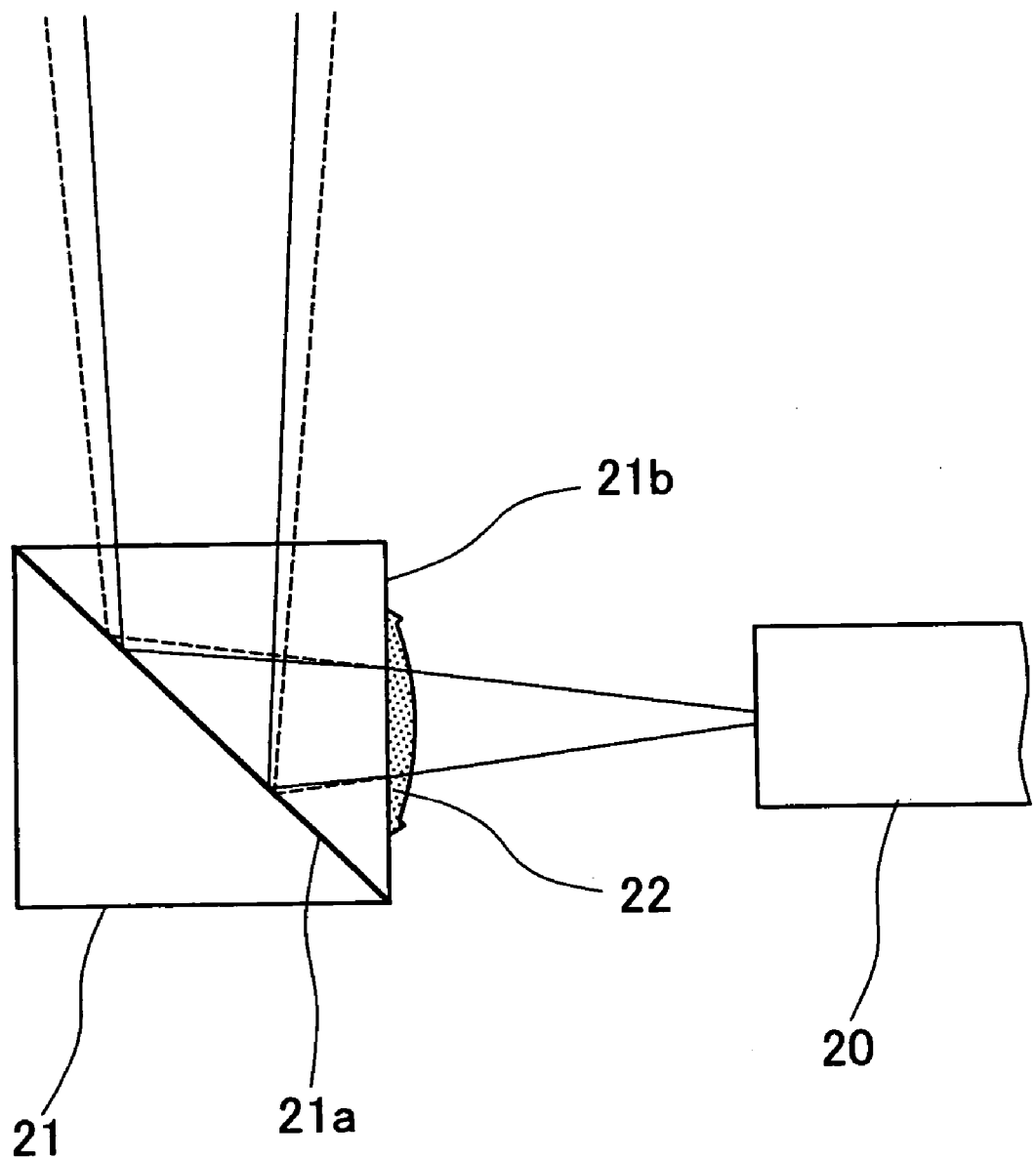
FIG. 4 is a schematic view of a lens-laminated beam splitter, i.e., a second embodiment of the lens-laminated composite optical element according to the present invention.

Now, turning to FIGS. 4 and 5, there is shown a second embodiment of the present invention. In the case of an optical system of this second embodiment, as shown in FIG. 4, a laser beam which is projected from the second laser light source 20 is reflected off a half-mirror surface 21a of a beam splitter 21, and a convex lens portion 22 is integrally laminated on the beam splitter 21 for controlling the degree of divergence of the laser beam which is cast on a plane of incidence 21b of the beam splitter 21. In this case, the lens portion 22 is directly laminated on the plane of incidence 21b of the beam splitter 21. Therefore, the light flux, which would otherwise tend to diverge to a larger diameter as indicated by a broken line in FIG. 4, is controlled to a smaller diameter by the action of the lens portion 22 as indicated by solid line in the same figure.

Thus, a lens-laminated composite optical element which is composed of a thin wall lens portion 22 and a beam splitter 21 is obtained by integrally laminating a convex lens portion 22 on the beam splitter 21 as described above, more specifically, by laminating a lens portion 22 which is thin-walled and which is slightly larger than a spot diameter of a light flux on the plane of incidence 21b. In this instance, the beam splitter 21 is a cubic prism which is formed by cementing together two triangular glass sheets. A half mirror surface 21a on the joining surface of one of the glass sheets, and the lens portion 22 is laminated on the other one of the glass sheets. According to the procedure shown in FIG. 5, the lens portion 22 is laminated on the other glass sheet 23 without a half mirror surface, more specifically, on a plane surface 23a of the other glass sheet 23, which ultimately serves as the light incident plane 21a of the beam splitter 21.

Namely, as shown in FIG. 5(a), a synthetic resin gob 25 to be molded into the transparent lens portion 22 is put on a mold with a transfer surface 24a for a convex lens, and the synthetic resin gob 25 is heated to a softened or molten state. In that state, the glass piece 23 is pressed against the synthetic resin gob 25 on the transfer surface 24a of the mold 24. At this time, in transferring the profile of the transfer surface 24a of the mold 24, the plane lens-laminating surface 23a of the glass piece 23 is stopped short of a contacting point relative to the mold 24 in order to expel and release air bubbles to the outside. As soon as a convex lens profile is transferred to the softened or molten synthetic resin material to be formed into a laminated lens portion 22, the molded synthetic resin material is irradiated with an ultraviolet ray which is projected from above by an ultraviolet irradiator 26 and through the glass piece 23 as shown in FIG. 5(c), until the laminated lens portion 22 is completely hardened.

Then, as shown in FIG. 5(d), the mold 24 is separated away from the lens portion 22 which has been molded and laminated on the glass piece 23. Then, the lens-laminated glass piece 23 in the shape of a triangular pyramid is cemented with another glass piece with a half mirror surface to make up a beam splitter 21 with a laminated lens portion 22 on a plane of incidence.

The transfer surface of the mold to be impressed on the lens portion 22 on the glass piece 23 may be of a cylindrical or curved shape other than spherical or approximately spherical shapes. That is to say, a cylindrical lens can be laminated on a piece of glass for use in shaping a circular incident light beam into an elliptical pattern. In a case where a thermosetting resin is used for molding the lens portion in place of a resin which is hardened under irradiation of an ultraviolet ray, the mold is heated up to a point above the hardening temperature of the resin. In addition to a light incident surface, a plastic lens portion may be laminated on other surface of a glass piece (e.g., on the light exit plane of the glass piece 21 shown in FIG. 4). Otherwise, a number of lens portions can be laminated at separate positions on the same plane of one glass piece if necessary.

What is claimed is:

1. A lens-laminated composite optical element, comprising:
    an optical element having an optical film layer, selected from a polarized beam separator film layer and a half mirror film layer, on a first surface of a glass member to separate incident light into a transmitted light component and a reflected light component; and
    a relatively thin plastic lens portion formed on a second surface of said glass member on the side away from said optical film layer, and provided with a curved lens surface for correction of aberration or for beam shaping purposes;
    said plastic lens portion being formed on said glass member by laminating thereon a film-like transparent synthetic resin material by the use of a mold means.

2. A lens laminated composite optical element as set forth in claim 1, wherein said synthetic resin material of said plastic lens portion is an ultraviolet curing resin.

3. A lens-laminated composite optical element, comprising:
    a polarized prism having a polarized light separator film layer on a first surface of a glass sheet, said polarized prism being located in light paths of first and second light beams from first and second light sources to guide said first and second light beams to a same light path by transmitting and reflecting said first and second light beams, respectively; and
    a relatively thin plastic lens portion formed on a second surface, on a side of the glass sheet opposite the first surface, said plastic lens portion being provided with a curved lens surface for correction of aberrations occurring to said first light beam on transmission through said glass sheet and said polarized light separator film layer;
    said plastic lens portion being formed on said glass sheet by laminating thereon a film-like transparent synthetic resin material by the use of a mold means.

4. A lens-laminated composite optical element, comprising:
    a cubic prism formed by joining two triangle sheets of glass together and provided with an optical film layer at a jointed plane to separate incident light into two separate components by transmission and reflection; and
    a relatively thin plastic lens portion formed on a plane of incidence of said cubic prism, said plastic lens portion being provided with a curved lens surface for correction of aberration or beam shaping purposes;
    said plastic lens portion being formed on said plane of incidence of said cubic prism by laminating thereon a film-like transparent synthetic resin material by the use of a mold means.

5. A method for fabricating a lens-laminated composite optical element by molding and laminating an aberration correcting or beam shaping plastic lens portion on a plane surface of a vitreous optical element, said method comprising:
    placing a gob of an ultraviolet curing resin material on a mold having at a top end a transfer surface corresponding to a predetermined curved profile of a plastic lens to be laminated;
    heating said resin gob to a softened or molten state;
    compressing said gob between said transfer surface of said mold and said plane surface of said vitreous optical element to transfer said curved profile to the softened or molten resin material while molding same into a film-like thin plastic lens;
    hardening said film-like thin plastic lens by irradiating ultraviolet rays from an opposite side of said vitreous optical element away from said plane surface; and
    separating said mold away from said vitreous optical element, leaving a laminated film-like thin plastic lens portion on the latter, wherein said vitreous optical element is selected from a prism, a half mirror and a reflecting mirror.

6. The lens-laminated composite optical element of claim 1, wherein a thickness of the plastic lens portion in a direction perpendicular to the second surface of the glass member is less than a minimum thickness of the glass member in the direction perpendicular to the second surface.

7. The lens-laminated composite optical element of claim 3, wherein a thickness of the plastic lens portion in a direction perpendicular to the second surface of the glass sheet is less than a minimum thickness of the glass sheet in the direction perpendicular to the second surface.

8. The lens-laminated composite optical element of claim 4, wherein a thickness of the plastic lens portion in a direction perpendicular to the plane of incidence of the cubic prism is less than a minimum thickness of the cubic prism in the direction perpendicular to the plane of incidence.

* * * * *